(12) United States Patent
Yamaguchi et al.

(10) Patent No.: US 8,271,749 B2
(45) Date of Patent: Sep. 18, 2012

(54) STORAGE SUBSYSTEM AND METHOD OF EXECUTING COMMANDS BY CONTROLLER

(75) Inventors: Yasuhiko Yamaguchi, Hiratsuka (JP); Youichi Gotoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 576 days.

(21) Appl. No.: 12/232,217

(22) Filed: Sep. 12, 2008

(65) Prior Publication Data

US 2010/0023712 A1    Jan. 28, 2010

(30) Foreign Application Priority Data

Jul. 23, 2008 (JP) ................................. 2008-190242

(51) Int. Cl.
  *G06F 12/00* (2006.01)
  *G06F 13/00* (2006.01)
  *G06F 13/28* (2006.01)
(52) U.S. Cl. ................. 711/158; 711/154; 711/E12.001
(58) Field of Classification Search .................. None
  See application file for complete search history.

(56) References Cited

U.S. PATENT DOCUMENTS

| 4,533,996 | A | 8/1985 | Hartung et al. | |
|---|---|---|---|---|
| 6,304,906 | B1* | 10/2001 | Bhatti et al. | 709/227 |
| 6,343,324 | B1* | 1/2002 | Hubis et al. | 709/229 |
| 6,526,484 | B1* | 2/2003 | Stacovsky et al. | 711/158 |
| 6,564,304 | B1* | 5/2003 | Van Hook et al. | 711/154 |
| 7,877,558 | B2* | 1/2011 | Hughes et al. | 711/158 |
| 7,970,970 | B2* | 6/2011 | Subramanian et al. | 710/112 |
| 2002/0038391 | A1 | 3/2002 | Ido et al. | |
| 2002/0103923 | A1* | 8/2002 | Cherian et al. | 709/235 |
| 2003/0056060 | A1* | 3/2003 | Hertz et al. | 711/112 |
| 2003/0220991 | A1* | 11/2003 | Soejima et al. | 709/221 |
| 2005/0044289 | A1* | 2/2005 | Hendel et al. | 710/33 |
| 2005/0223138 | A1* | 10/2005 | Shiraki et al. | 710/36 |
| 2006/0206638 | A1* | 9/2006 | Shiraki et al. | 710/51 |

(Continued)

FOREIGN PATENT DOCUMENTS

JP    58-158757    9/1983

(Continued)

OTHER PUBLICATIONS

Office Action from the Japanese Patent Office, corresponding to Japanese Patent Application No. 2008-190242, dated Mar. 6, 2012, pp. 1-3.

(Continued)

*Primary Examiner* — Edward Dudek, Jr.
*Assistant Examiner* — Matthew Chrzanowski
(74) *Attorney, Agent, or Firm* — Stites & Harbison, PLLC; Juan Carlos A. Marquez, Esq

(57) ABSTRACT

A storage subsystem capable of processing time-critical control commands while suppressing deterioration of the system performance to a minimum. When various commands are received in a multiplex manner via the same port from plural host devices, the channel adapter of the storage subsystem extracts commands of a first kind from the received commands. Then, the adapter executes the extracted commands of the first kind with high priority within a given unit time until a given number of guaranteed activations is reached. At the same time, commands of a second kind are enqueued in a queue of commands. After the commands of the first kind are executed as many as the number of guaranteed activations, the commands of the second kind are executed in the unit time.

12 Claims, 14 Drawing Sheets

U.S. PATENT DOCUMENTS

| | | | |
|---|---|---|---|
| 2006/0224784 A1 | 10/2006 | Nishimoto et al. | |
| 2007/0118624 A1* | 5/2007 | Soejima et al. | 709/220 |
| 2007/0239902 A1 | 10/2007 | Shimizu et al. | |
| 2008/0005490 A1* | 1/2008 | Shiraki et al. | 711/147 |
| 2008/0091883 A1* | 4/2008 | Cox et al. | 711/130 |
| 2008/0162735 A1 | 7/2008 | Voigt et al. | |

FOREIGN PATENT DOCUMENTS

| | | |
|---|---|---|
| JP | 6-35854 | 7/1992 |
| JP | 6-119282 | 10/1992 |
| JP | 2002-108567 | 4/2002 |
| JP | 2007-323356 | 5/2006 |
| JP | 2007-233834 | 9/2007 |

OTHER PUBLICATIONS

Extended Search Report, from the European Patent Office, corresponding to European Application No. 09 15 0353.2, dated Jun. 13, 2012, pp. 1-6.

* cited by examiner

FIG. 3

300 TABLE OF PRIORITY COMMANDS

| COMMAND CODE (COMMAND NAME) | NUMBER OF GUARANTEED ACTIVATIONS | NUMBER OF PROCESSES |
|---|---|---|
| 0x00 (TestUnitReady) | 0 | 0 |
| ⋮ | ⋮ | ⋮ |
| 0x12 (Inquiry) | 256 | 250 |
| ⋮ | ⋮ | ⋮ |
| 0x25 (ReadCapacity) | 256 | 160 |
| ⋮ | ⋮ | ⋮ |
| 0x28 (Read (10)) | 0 | 0 |
| ⋮ | ⋮ | ⋮ |
| 0x2A (Write (10)) | 0 | 0 |
| ⋮ | ⋮ | ⋮ |
| 0xFF | 0 | 0 |

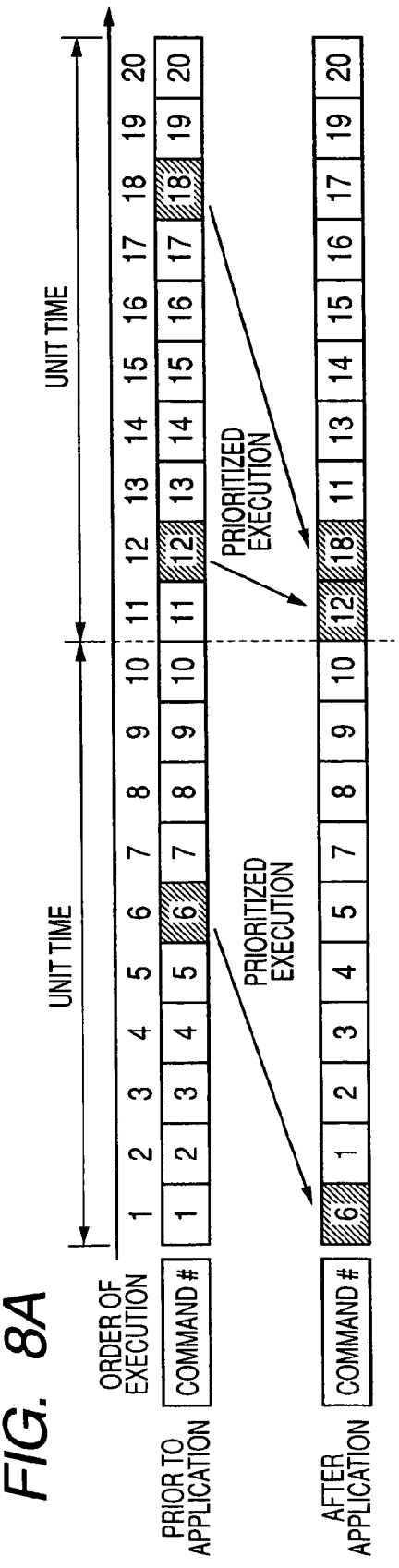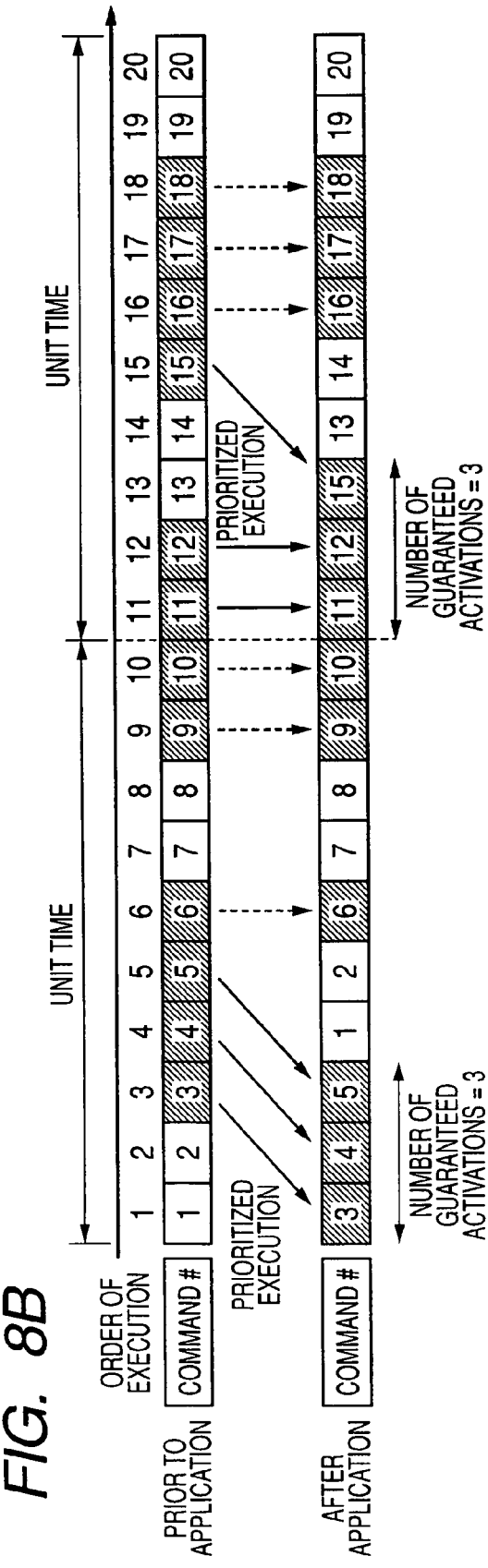

FIG. 9

900 TABLE OF PRIORITY COMMANDS

| COMMAND CODE (COMMAND NAME) 301 | LBA SPECIFYING FLAG 901 | PRIORITY LBA RANGE 902 | NUMBER OF GUARANTEED ACTIVATIONS 302 | NUMBER OF PROCESSES 303 |
|---|---|---|---|---|
| 0x00 (TestUnitReady) | 0 | 0x00 | 0 | 0 |
| .. | .. | .. | .. | .. |
| 0x08 (Read (6)) | 0 | 0x00 | 128 | 128 |
| .. | .. | .. | .. | .. |
| 0x12 (Inquiry) | 0 | 0x00 | 256 | 126 |
| .. | .. | .. | .. | .. |
| 0x28 (Read (10)) | 1 | 0x00 | 128 | 0 |
| .. | .. | .. | .. | .. |
| 0x2A (Read (10)) | 1 | 0x100 | 128 | 16 |
| .. | .. | .. | .. | .. |
| 0xFF | 0 | 0x00 | 0 | 0 |

FIG. 14

1400 TABLE OF PRIORITY COMMANDS

| HOST WWN 1201 | COMMAND CODE (COMMAND NAME) 301 | LBA SPECIFYING FLAG 901 | PRIORITY LBA RANGE 902 | NUMBER OF GUARANTEED ACTIVATIONS 302 | NUMBER OF PROCESSES 303 |
|---|---|---|---|---|---|
| 0x1234567890000000 | 0x00 (TestUnitReady) | 0 | 0x00 | 0 | 0 |
| | .. | .. | .. | .. | .. |
| | 0x08 (Read (6)) | 0 | 0x00 | 128 | 128 |
| | .. | .. | .. | .. | .. |
| | 0x12 (Inquiry) | 0 | 0x00 | 256 | 126 |
| | .. | .. | .. | .. | .. |
| | 0xFF | 0 | 0x00 | 0 | 0 |
| 0x1234567890000020 | 0x00 (TestUnitReady) | 0 | 0x00 | 0 | 0 |
| | .. | .. | .. | .. | .. |
| | 0x08 (Read (6)) | 0 | 0x00 | 256 | 115 |
| | .. | .. | .. | .. | .. |
| | 0xFF | 0 | 0x00 | 0 | 0 |
| 0x12345678900000ff | 0x00 (TestUnitReady) | 0 | 0x00 | 0 | 0 |
| | .. | .. | .. | .. | .. |
| | 0x08 (Read (6)) | 0 | 0x00 | 128 | 76 |
| | .. | .. | .. | .. | .. |
| | 0xFF | 0 | 0x00 | 0 | 0 |
| .. | | | | | |

STORAGE SUBSYSTEM AND METHOD OF EXECUTING COMMANDS BY CONTROLLER

CROSS REFERENCES TO RELATED APPLICATIONS

This application relates to and claims priority from Japanese Patent Application No. P2008-190242, filed on Jul. 23, 2008, the entire disclosure of which is incorporated herein by reference.

BACKGROUND OF THE INVENTION

1. Field of the Invention

The present invention relates to a storage subsystem and a method of executing commands by a controller. More particularly, the invention relates to a technique in which a controller of a storage subsystem receiving commands issued by a host computer determines the priority orders of executions of the commands and schedules the executions.

2. Description of the Related Art

In recent years, computer systems based on a SAN (storage area network) have exploited virtualization techniques in order to effectively use resources within server computers or data storage apparatus. Especially, virtual OS techniques in which plural OSes are operated within a server computer are rapidly spreading.

Under these virtual environments, a data storage apparatus receives accesses from plural virtual OSes via the same port. Therefore, there is the possibility that the storage apparatus receives I/O commands such as read commands and write commands from a virtual OS via one port while receiving control commands associated with device recognition from another virtual OS. Therefore, the processor in charge of the port processes both kinds of commands, i.e., I/O commands and control commands. Generally, an I/O command places greater load on the processor than a control command. Accordingly, where the storage apparatus is receiving multiple I/O commands from a virtual OS and thus high load is placed on the processor, if control commands are received from a second virtual OS, the processor cannot process the control commands within a stipulated period of time, inducing a timeout error. As a result, in the worst case, the system associated with the second virtual OS becomes stalled. On the other hand, if priority is given to the processing of control commands, I/O processing that is the intrinsic processing of the storage apparatus is delayed, thus affecting the system performance.

Patent reference 1 cited below discloses a technique for preventing processing of a certain host or device from being performed with high priority at all times, thus making uniform every set of processing. In particular, in the technique of patent reference 1, after the termination of execution of commands from a certain host, the control apparatus places the execution priority order of enqueued commands from this host into the lowest position. Priority is given to processing of commands from other hosts. After the end of execution of commands issued to a certain device, the execution priority order of enqueued commands from the certain device is placed at the lowest position. Priority is given to processing of commands issued to other devices.

Patent reference 2 discloses a technique for controlling the number of commands issued in a multiplex manner from a host device. In particular, in the technique of patent reference 2, the storage controller calculates the number of receivable commands for each port. The host device is informed of this number. The host device issues commands to the storage controller according to the notified number of receivable commands.

Patent reference 3 discloses a system for assuring quick response to commands to execute a certain process with high priority rather than a process scheduled by a dynamic priority degree scheduling mechanism.

Patent reference 1: JP-A-6-119282
Patent reference 2: JP-A-2007-323356
Patent reference 3: JP-A-6-35854

None of the data storage apparatus disclosed in the above-cited patent references have scheduled processing of commands while taking account of the kinds and attributes of the commands. Consequently, it has been difficult to process time-critical control commands while suppressing deterioration of the system performance to a minimum.

SUMMARY OF THE INVENTION

Accordingly, it is an object of the present invention to provide a storage subsystem capable of processing time-critical control commands while suppressing deterioration of the system performance to a minimum.

A storage subsystem which achieves the foregoing object in accordance with the teachings of the present invention has a channel adapter which, when it receives various commands from plural host devices in a multiplex manner via the same port, extracts commands of a first kind from the received commands. The extracted commands of the first kind are executed with high priority within a given unit time until a give number of guaranteed activations is reached. At the same time, the channel adapter enqueues commands of a second kind into a queue of commands. After the commands of the first kind are executed as many as the number of guaranteed activations, the commands of the second kind are executed for the unit time.

In particular, one aspect of the present invention provides a storage subsystem having a storage device and a controller for controlling the storage device that has hard disk drives. The controller has a channel adapter and a disk adapter for controlling access to a given storage region in the hard disk drives. The channel adapter has a port connecting at least one host computer via a network. The disk adapter connects the hard disk drives, and has a table of priority commands defining attributes of the commands. When plural commands are received from the at least one host computer via the port, the channel adapter extracts priority commands from the received commands according to the attributes defined in the table of priority commands, and executes the priority commands successively in preference to non-priority commands.

Consequently, the storage subsystem can execute time-critical commands (e.g., control commands) with high priority. Therefore, if multiple I/O commands are concentrated and the processor is heavily loaded, generation of a timeout error can be suppressed.

In one embodiment of the present invention, the attributes of the commands include the number of guaranteed activations indicating the number of guaranteed activations of the commands within a given unit time. The channel processor determines each of the received commands either as a priority command or as a non-priority command according to the number of guaranteed activations. The channel processor executes the priority commands successively as many as the number of guaranteed activations within the given unit time.

Because the storage subsystem executes the priority commands with high priority, the situation that non-priority commands are not executed at all can be avoided. Time-critical control commands can be processed while suppressing deterioration of the system performance to a minimum.

Another aspect of the present invention provides a method of executing commands by a controller of a storage subsystem that controls access to a storage device in response to commands issued from host computer. This method of executing commands starts with holding a table of priority commands defining attributes of the commands. Then, plural commands are received from the at least one host computer via a port. Priority commands are extracted from the received commands according to the attributes defined in the table of the priority commands. The extracted priority commands are executed successively in preference to non-priority commands.

According to the present invention, the storage subsystem can process time-critical control commands while suppressing deterioration of the system performance to a minimum.

BRIEF DESCRIPTION OF THE DRAWINGS

FIG. 3 is a table of priority commands used in a channel adapter associated with one embodiment of the invention;

FIGS. 8A and 8B are diagrams illustrating scheduling of priority commands in a channel adapter associated with one embodiment of the invention;

FIG. 9 is a table of priority commands in a channel adapter associated with one embodiment of the invention;

FIG. 14 is a table of priority commands used in a channel adapter associated with one embodiment of the invention.

DETAILED DESCRIPTION OF THE INVENTION

Figure 1:
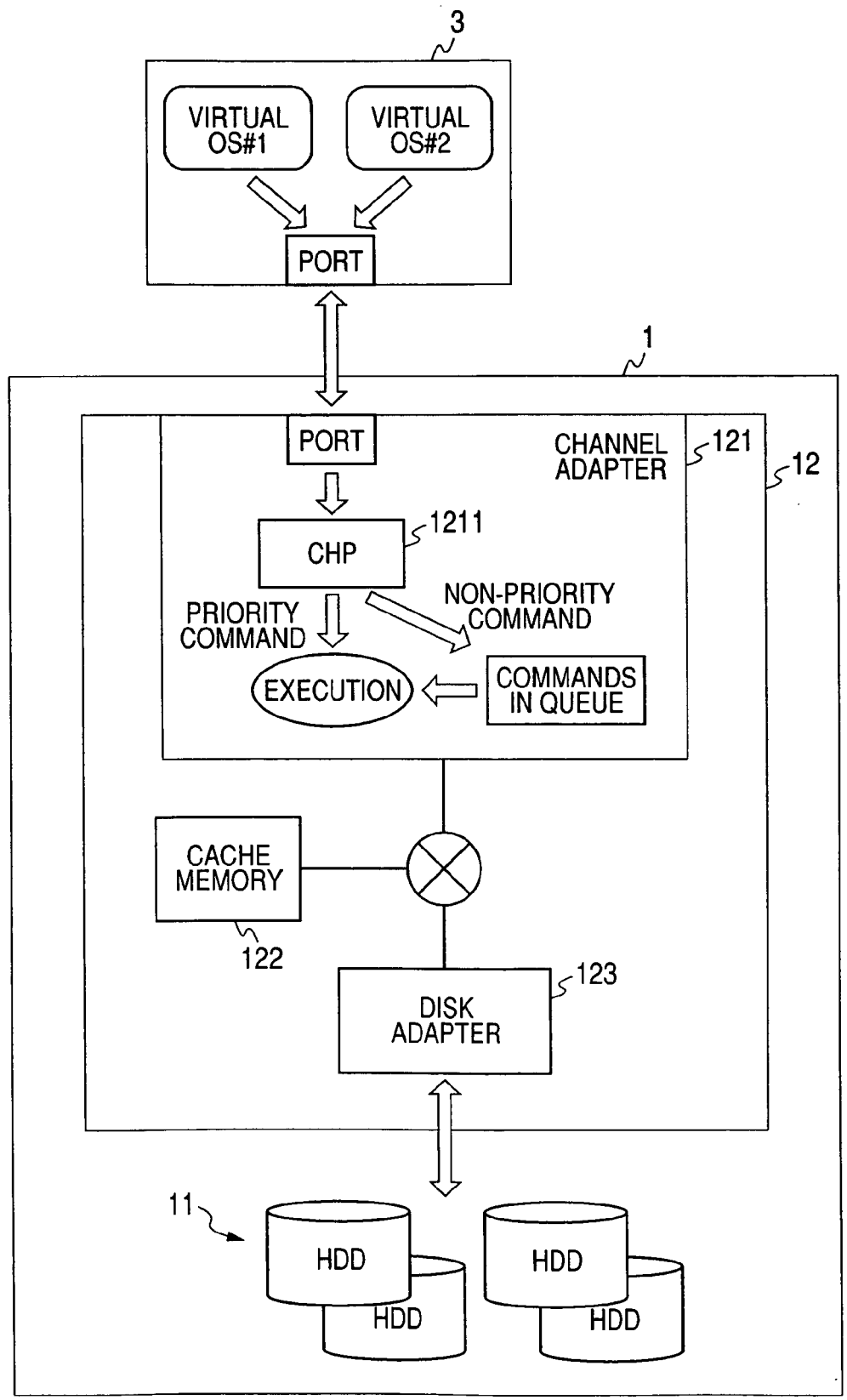
FIG. 1 is a conceptual diagram illustrating the features of a storage subsystem according to the present invention.

The present invention is characterized in that when a channel adapter of a storage subsystem receives various commands in a multiple manner via the same port from plural host devices, the adapter extracts commands of a first kind (priority commands) from the received commands and executes the extracted commands of the first kind with high priority until a given number of guaranteed activations is reached in a given unit time (1 execution cycle, for example, of 1 second). At the same time, the adapter enqueues commands of a second kind (non-priority commands) into a queue of commands (FIFO buffer). After commands of the first kind are executed as many as the number of guaranteed activations, commands of the second kind are executed in the unit time. Commands of the first kind not processed because the number of guaranteed activations has been reached are enqueued in the queue of commands together with non-priority commands. The enqueued commands wait for a FIFO execution. FIG. 1 conceptually illustrates the features of the present invention.

FIG. 1 shows a storage subsystem 1 connected with a host computer 3. The subsystem 1 has a channel adapter 121 that now receives various commands in a multiplex manner via the same port from plural virtual OSes in the host computer 3. A channel processor (CHP) 1211 incorporated in the channel adapter 121 makes a decision as to whether each received command is a priority command or a non-priority command. If it is a priority command, it is immediately executed. On the other hand, if it is a non-priority command, it is enqueued in a queue of commands. Where there are plural priority commands, they are similarly successively extracted via a queue of priority commands (not shown) and executed. The number of priority commands that can be executed by the channel processor 1211 in a unit time is limited to a preset number of guaranteed activations. After the channel processor 1211 executes priority commands as many as the given number of guaranteed activations in the unit time, the processor successively executes the commands enqueued in the queue of commands. It is here assumed that the priority commands are control commands based on device recognition commands and that non-priority commands are I/O commands such as read commands and write commands. The invention is not limited to this example.

In FIG. 1, an example is shown in which commands are entered from plural OSes in the host computer 3 into one port of the channel adapter 121. Furthermore, a configuration in which commands are entered into one port of the channel adapter 121 from plural host computers 3 via a network switch is within the scope of the present invention.

Embodiments of the present invention are hereinafter described with reference to the accompanying drawings.

First Embodiment

Figure 2:
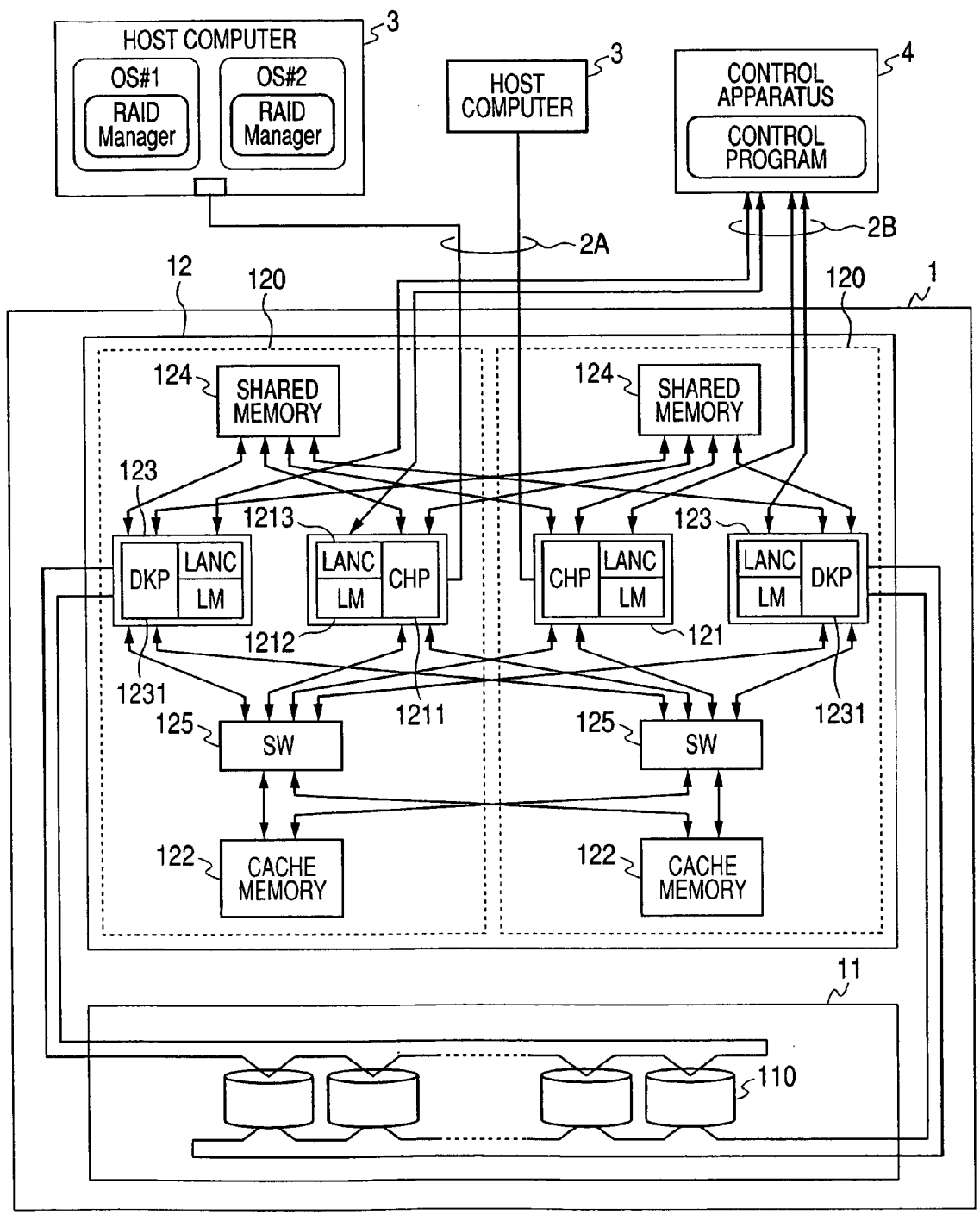
FIG. 2 is a diagram illustrating the whole configuration of a storage subsystem associated with one embodiment of the invention.

FIG. 2 is a diagram illustrating the whole configuration of a storage subsystem associated with a first embodiment of the present invention. The storage subsystem 1 shown in FIG. 2 is connected with host computers 3 via a network 2A. Thus, a computer network is constituted. The storage subsystem 1 is also connected with a control apparatus 4 via a control network 2B.

For example, any one of a LAN, the Internet, and a SAN (storage area network) can be used as the network 2A. Typically, the network is built including a network switch, a hub, and other components. In the present embodiment, it is assumed that the network 2A is composed of a SAN (FC-SAN) using fiber channel protocols and that the control network 2B is made of a TCP/IP-based LAN.

Each host computer 3 has hardware resources including a processor, a main memory, communication interfaces, and local input-output devices. Furthermore, the host computer has software resources (not shown) including device drivers, operating systems (OSes), and application programs. Thus, the host computer 3 executes various application programs under control of the processor and cooperates with the hardware resources to execute desired processing while making access to the storage subsystem 1. Furthermore, in the present embodiment, virtual OS technology is adopted to permit plural OSes to be run independently in the host computer 3. Therefore, each virtual OS executed in the host computer 3 can behave like an independent computer (i.e., an independent virtual machine) Each virtual OS in the host computer 3 executes a RAID manager for managing the RAID configuration of the storage subsystem 1.

The storage subsystems is a data storage apparatus for offering data storage services to the host computer 3. Typically, the storage subsystem 1 is made of a storage device 11 and a controller 12 for controlling the storage device 11 including a storage medium for storing data. The storage device 11 and controller 12 are connected via a disk cable such as optical fiber. The internal hardware configuration of the controller 12 is duplexed. The controller 12 can make access to the storage device 11 via two channels (paths).

The storage device 11 is typically made of at least one drive unit including mass storage hard disk drives 110 and a control circuit (not shown) for controlling operation of the disk drives. Instead of the hard disk drives 110, solid-state devices (SSDs) such as flash memories can be used. In the present embodiment, the hard disk drives 110 are connected in an FC-AL topology. It is to be noted, however, that other network topologies are not eliminated. The storage device 11 may also be referred to as a disk array.

Typically, the hard disk drives 110 form a RAID group based on a given RAID configuration and undergo I/O accesses under RAID control. The RAID control is performed, for example, by a known RAID controller or RAID engine (not shown) mounted in the controller 12. The RAID group may be made of only the hard disk drives 110 within one drive unit or made of hard disk drives 110 belonging to plural drive units. The hard disk drives 110 belonging to the same RAID group is treated as one logical device (virtual device). At least one logical unit (LU) is formed in the virtual device.

The controller 12 is a system component that controls the whole storage subsystem 1. Its main purpose is to provide I/O control over the storage device 11 based on I/O access requests (I/O commands) from the host computers 3 (i.e., virtual machines). Each I/O command includes a logical address indicating a storage region in the logical unit. The logical address includes a logical unit number (LUN) and a logical block address (LBA). When an I/O command is received from the host computer 3, the controller 12 converts a logical address specified by the I/O command into a physical address and makes an access to a given storage region in any one of the hard disk drives 110.

The controller 12 accepts a control command based on a device recognition command, in addition to I/O commands. The device recognition command is issued to permit a host device such as the host computer 3 made, for example, of a virtual machine to recognize the system configuration of the storage device 11. Typically, the device recognition command is made of a sequence of commands interpreted and executed by the controller 12. The controller 12 of the present embodiment has a mechanism for processing certain commands (priority commands) of the accepted various kinds of commands in preference to other commands (non-priority commands) in a unit time until a given number of guaranteed activations is reached. In the present embodiment, this mechanism is incorporated in the channel adapter 121.

As described previously, in the present embodiment, the components within the controller 12 are duplexed to achieve fault tolerance. In the following description, each duplexed controller 12 is referred to as the controller 120.

Each controller 120 includes the channel adapter (CHA) 121, a cache memory (CM) 122, a disk adapter (DKA) 123, a shared memory 124, and a switching portion 125.

The channel adapter 121 is an interface for connecting the host computer 3, and controls data communications with the host computer 3 according to given protocols. The channel adapter 121 includes plural chipsets each including the channel processor (CHP) 1211, a local memory (LM) 1212, and a LAN controller (LANC) 1213. In the figure, typical one chipset is shown. The chipsets are assigned to plural ports (not shown), respectively, of the channel processor 1211. The channel processor 1211 communicates with the host computer 3 via the ports. For example, when the channel processor 1211 receives a write request (write command) from the host computer 3, the processor writes the write command and data complying with the command into the cache memory 122 via the switching portion 125. The local memory 1212 functions as a main memory of the channel processor 1211. The local memory 1212 of the present embodiment holds a table 300 of priority commands (FIG. 3) defining the attributes of the commands. In the present embodiment, each command has an attribute indicating whether it is a priority command or a non-priority command. A command queue region is formed in the local memory 1212. The LAN controller 1213 is a circuit for controlling communications with the control apparatus 4 (described later).

The cache memory 122 is a memory for temporarily storing data exchanged between the channel adapter 121 and the disk adapter 123. For example, the cache memory 122 is made of a volatile memory such as a DRAM or of a volatile memory such as a flash memory.

The disk adapter 123 is an interface for connecting the storage device 11, and controls data communications complying with given protocols with the storage device 11 in accordance with the I/O commands from the host computer 3. The disk adapter 123 is similar in configuration with the channel adapter 121, and includes plural chipsets each having a disk processor (DKP), a local memory (LM), and a LAN controller (LANC). The disk processor 1231 periodically checks the cache memory 122. If the processor finds an I/O command in the cache memory 122, the processor makes access to the hard disk drives 110 in the storage device 11 in accordance with the I/O command.

More specifically, if a write command is found in a given cache memory region in the cache memory 122, for example, the disk processor 1231 makes access to the storage device 11 to cause data in the cache memory 122 specified by the write command to be destaged to the given storage region in the hard disk drives 110. Furthermore, if a read command is found in the cache memory 122, the disk processor 1231 makes access to the storage device 11 in order that data in the hard disk drive 110 specified by the read command be staged to a given cache region in the cache memory 122.

The shared memory 124 is shared between the channel adapter 121 and disk adapter 123. The shared memory 124 is also made of a volatile memory such as a DRAM or a non-volatile memory such as a flash memory. The shared memory 124 stores information about the configuration of the storage subsystem 1 itself. The information about the system configuration is necessary to run the storage subsystem 1, and includes information about logical volume configuration and information about the RAID configuration, for example.

The control apparatus 4 is a terminal device permitting the system administrator to manage the whole storage subsystem 1. Typically, the control apparatus is made of a general-purpose computer loaded with a control program. The control apparatus 4 may also be referred to as a service processor (SVP). In the figure, the control apparatus 4 is mounted outside the storage subsystem 1 via the control network 2B. The present invention is not limited to this structure. The control apparatus may also be mounted inside the storage subsystem 1. Alternatively, the controller 12 may be configured to have functions equivalent to those of the control apparatus 4.

The system administrator gives instructions to the controller 12 via a user interface offered by the control apparatus 4. Consequently, it is possible to acquire, refer, set, and modify information about the system configuration of the storage subsystem 1. For example, the system administrator can set logical volumes or virtual volumes by manipulating the control apparatus 4 according to an increase or decrease in the hard disk drives 110. Furthermore, the RAID configuration can be set.

In the present embodiment, the control apparatus 4 can set attributes of the commands for each chipset within the channel adapter 121. The attributes of the commands are kinds of the commands indicating whether they are priority commands or non-priority commands. If a command is a priority command, the number of guaranteed activations within a unit time is given. The set command attributes are held in the local memory 1212 as the table of priority commands 300.

FIG. 3 shows one example of the table of priority commands in the channel adapter 121 associated with a first embodiment of the present invention.

Referring to FIG. 3, the table of priority commands 300 includes columns of command codes 301, numbers of guaranteed activations 302, and numbers of processes 303. The command codes 301 are hexadecimal codes assigned to commands, respectively, treated by the controller 12. In the table of FIG. 3, command names are also shown for the sake of convenience. The numbers of guaranteed activations 302 indicate the numbers of guaranteed activations (executions) of the commands within a unit time. For example, 256 "Inquiry" commands (0x12) can be activated at maximum within the unit time. Where the value of the number of guaranteed activations 302 is "0", the command is treated as a non-priority command. Therefore, if the value of the number of guaranteed activations 302 is a positive number other than "0", the command is treated as a priority command. The number of processes 303 indicates the number of executions of the command within the unit time. The number of processes 303 is reset to its initial value "0" whenever the unit time passes.

Figure 4:
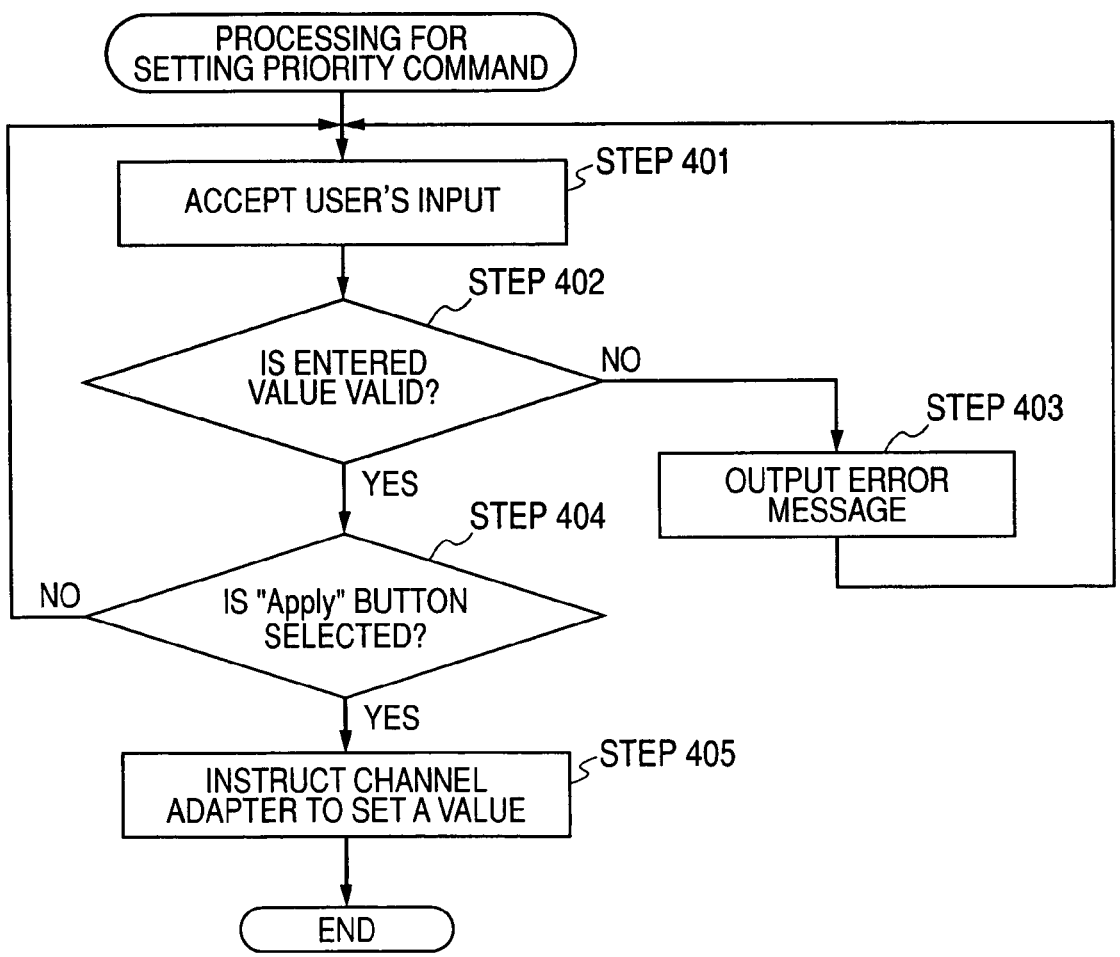
FIG. 4 is a flowchart illustrating processing for setting priority commands by a control apparatus associated with one embodiment of the invention.

FIG. 4 is a flowchart illustrating processing for setting priority commands by the control apparatus 4 associated with the first embodiment of the present invention. This processing for setting priority commands is achieved by causing the processor of the control apparatus 4 to execute a control program.

Figure 5:
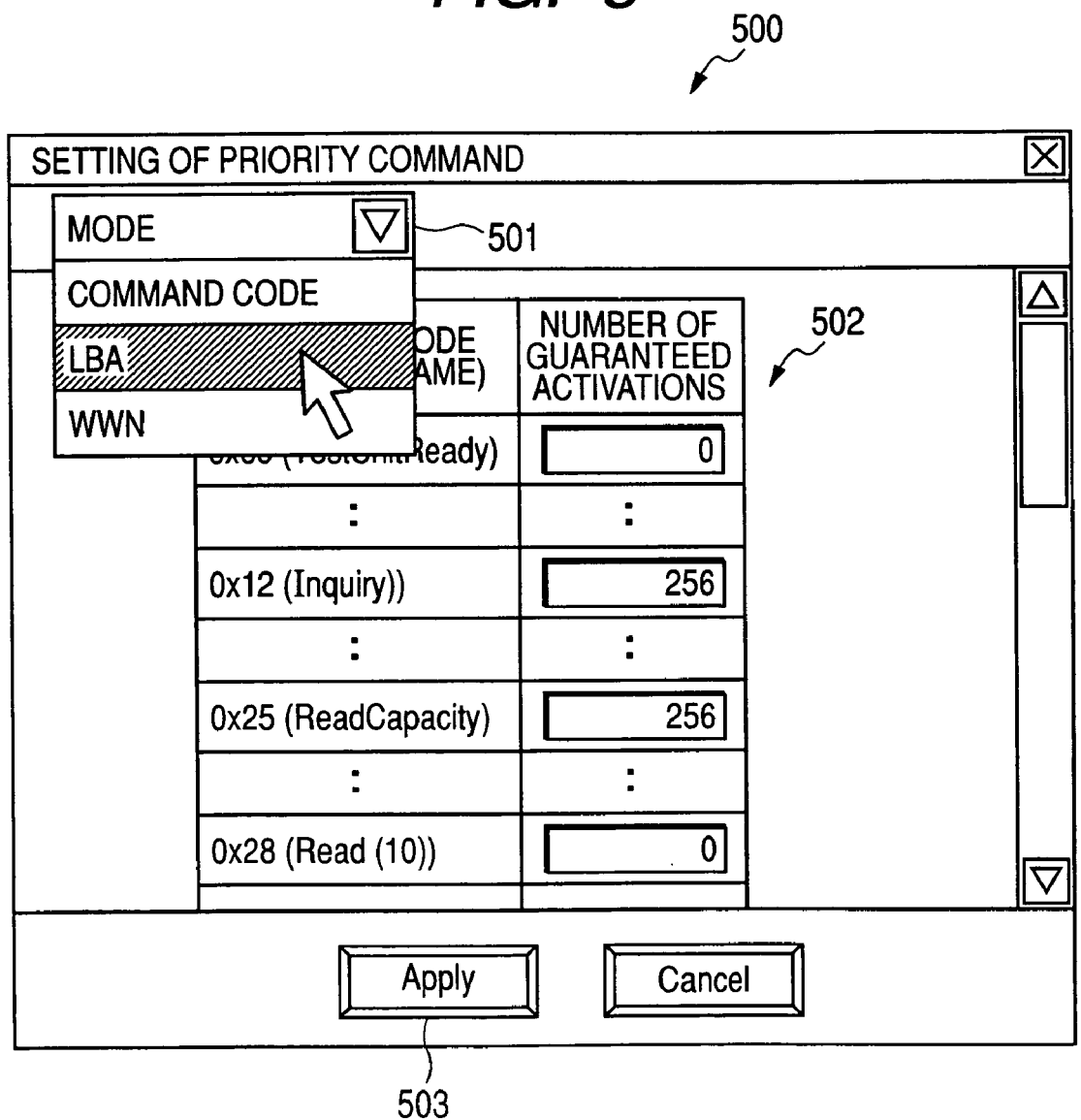
FIG. 5 is a diagram showing one example of priority command-setting window displayed on a user interface on a control apparatus associated with one embodiment of the invention.

Referring to FIG. 4, the control apparatus 4 presents a priority command-setting window 500 as shown in FIG. 5 on the user interface to the system administrator and accepts a given input (STEP 401). In the present embodiment, a value indicating the number of guaranteed activations is entered for each command. If the user manipulates a pointing device to specify a priority command-setting mode from a mode-setting menu 501, a priority command-setting table 502 according to the specified priority command-setting mode is presented. The user enters the number of guaranteed activations for each individual command in the priority command-setting table 502.

Returning to FIG. 4, if the number of guaranteed activations is entered via the priority command-setting window 500 displayed on the user interface, the control apparatus 4 makes a decision as to whether the number of guaranteed activations is a valid value (STEP 402). For example, if a negative value is entered or if the entered value is in excess of normally assumed values, the entered value is judged not to be valid. If the decision is that the entered number of guaranteed activations is not a valid value (decision at STEP 402 is negative (No)), the control apparatus 4 displays an error message (STEP 403) and again prompts the user to make an input.

On the other hand, if the control apparatus 4 judges that the entered number of guaranteed activations is a valid value (the decision at STEP 402 is affirmative (Yes)), the control apparatus accepts an input of the number of guaranteed activations until "Apply" button 503 (FIG. 5) is selected. If the control apparatus 4 judges that the Apply button 503 is selected (STEP 404), a priority command-setting request is sent to the channel adapter 121 such that the number of guaranteed activations accepted for each command is set in the channel adapter 121 (STEP 405).

Thus, the channel adapter 121 receives the priority command-setting request via the LAN controller 1213 and creates or updates the priority command table 300 in the local memory 1222 based on the priority command-setting request under control of the channel processor 1211.

In the above example, the processing for setting priority commands by the control program in the control apparatus 4 is achieved. The invention is not limited to this. The processing for setting priority commands may be achieved by the RAID manager in the host computer 3. In addition, the user interface is not limited to GUI. It may also be Command Line Interface.

In the above example, the system administrator enters attributes of commands via the user interface. Alternatively, the table of priority commands 300 may be automatically created by storing command codes issued according to given sequential processing performed by the host computer 3 under control of the control apparatus 4 or RAID manager and the number of the issued codes into the channel adapter 121.

More specifically, the control apparatus 4 instructs the channel adapter 121 of the controller 12 to begin to accept an activation-assuring sequence before a virtual OS in the host computer 3 executes the commands obeying the processing of the activation-assuring sequence. In response to this, the channel adapter 121 operates in an activation-assuring sequence acceptance mode. The virtual OS confirms that the channel adapter 121 is operating in the activation-assuring sequence acceptance mode and executes the processing for the activation-assuring sequence. Consequently, a command sequence is issued to the channel adapter 121. The channel adapter 121 records codes of commands received during the operation in the activation-assuring sequence acceptance mode, as well as the number of the codes. Then, the control apparatus 4 instructs the channel adapter 121 to terminate the acceptance of activation-assuring sequence. In response to this, the channel adapter 121 determines the number of guaranteed activations 302 in the priority command table 300 based on the recorded command codes and the number of the codes.

Consequently, if the system administrator has no information about commands issued according to a certain sequence, the priority command table 300 can be automatically created in accordance with the activation-assuring sequence.

Where the channel adapter 121 automatically creates the priority command table 300 according to the activation-assuring sequence in this way, the control apparatus 4 acquires the contents of the priority command table 300 created from the channel adapter 121. This is displayed in the priority command-setting window 500. As a result, editing of the system administrator can be accepted.

Figure 6:
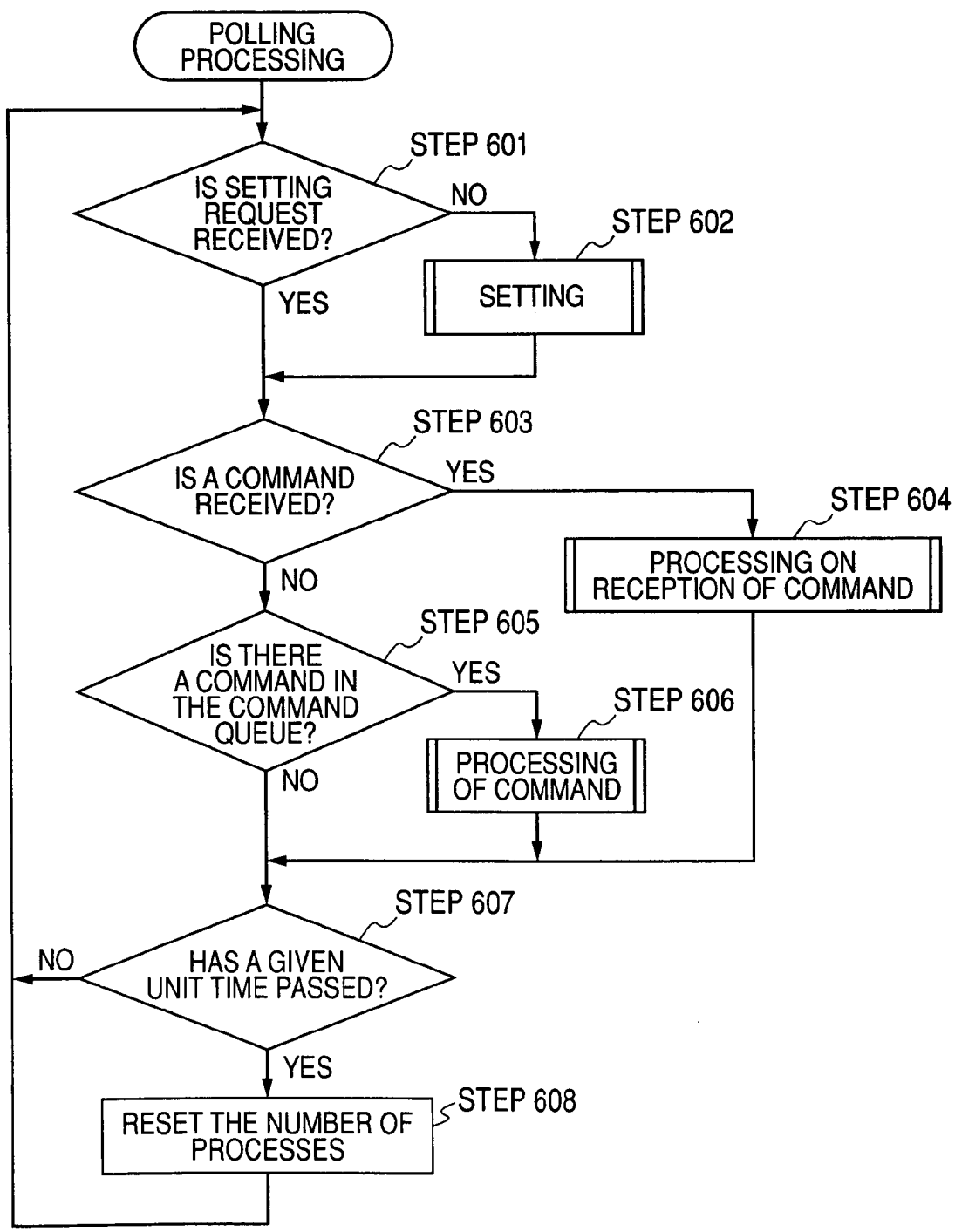
FIG. 6 is a flowchart illustrating polling processing performed in a channel adapter associated with one embodiment of the invention.

Various kinds of processing performed by the channel adapter 121 are next described. FIG. 6 is a flowchart illustrating polling processing performed in the channel adapter 121 associated with a first embodiment of the invention. The polling processing is performed by the channel processor 1211 to monitor occurrence of various events during operation of the storage subsystem 1. The polling processing is achieved, for example, by a kind of daemon program.

As shown in FIG. 6, in the polling processing, the channel processor 1211 monitors as to whether various setting requests have been received (STEP 601). If the decision at STEP 601 is affirmative (Yes), the channel processor 1211 performs setting processing according to the received setting request (STEP 602) For example, if a priority command-setting request has been received, the channel processor 1211 updates the priority command table 300 in the local memory 1212 according to the number of guaranteed activations specified by the priority command-setting request.

Then, the channel processor 1211 monitors whether or not various commands have been received (STEP 603). If the decision at STEP 603 is Yes (i.e., commands have been received), the channel processor 1211 performs processing according to the received commands (STEP 604). The processing performed on reception of commands will be described by referring to FIG. 7. After execution of the processing performed on reception of commands, the channel processor 1211 makes a decision as to whether a given unit time has passed (STEP 607).

Furthermore, the channel processor 1211 monitors whether or not any command is enqueued in a queue of commands (STEP 605). If the decision at STEP 605 is Yes (i.e., commands are enqueued in the command queue), the channel processor 1211 takes one command from the queue of commands and performs processing according to the command (STEP 606). For example, if the taken command is a write command, the channel processor 1211 writes the write command and data complying with it into a given region in the cache memory 122.

After checking the occurrence of each event, the channel processor 1211 makes a decision as to whether the given unit time has passed (STEP 607). If the decision at STEP 607 is affirmative (Yes) (i.e., the unit time has passed), the channel processor 1211 resets the value of the number of processes 303 for each command in the priority command table 300 to 0.

Figure 7:
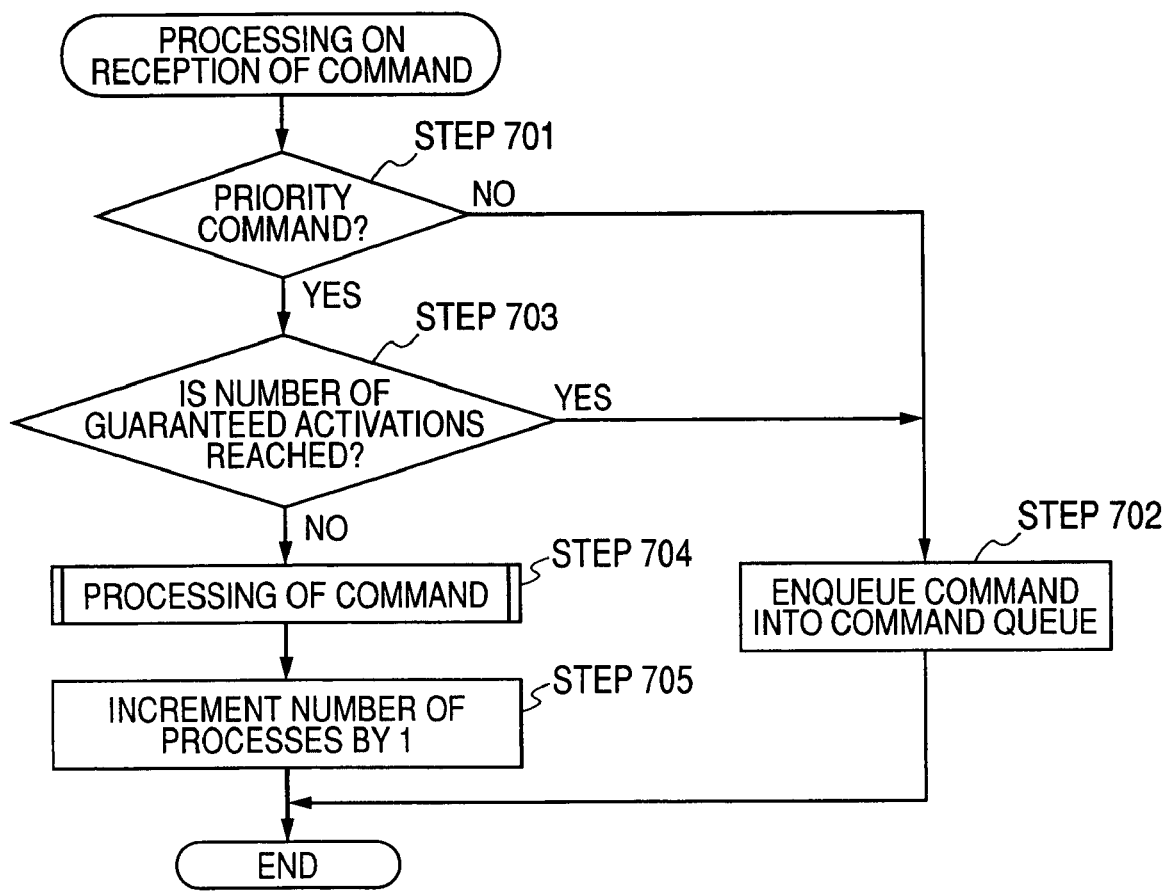
FIG. 7 is a flowchart illustrating processing performed when commands are received by a channel processor associated with one embodiment of the invention.

FIG. 7 is a flowchart illustrating processing performed when commands are received by the channel processor 1211 associated with the first embodiment of the invention. FIG. 7 particularly illustrates the processing indicated at STEP 604 of FIG. 6.

As illustrated in FIG. 7, the channel processor 1211 makes a decision as to whether the attributes of the received commands are judged, i.e., as to whether the received commands are priority commands, by referring to the priority command table 300 (STEP 700). As described previously, the decision as to whether or not they are priority commands depends on whether the value of the number of guaranteed activations 302 of the corresponding command in the priority command table 300 is nonzero. That is, if the value of the number of guaranteed activations 302 is nonzero, the command is judged to be a priority command.

If the decision at STEP 701 is negative (No), i.e., the received command is not a priority command, the channel processor 1211 enqueues the command (i.e., a non-priority command) into the queue of commands (STEP 702), and then the processing is terminated. In this case, commands enqueued in the queue of commands are executed at STEP 606 illustrated in FIG. 6. On the other hand, if the decision at STEP 701 is negative (No), i.e., the received command is a priority command, the channel processor 1211 makes a decision as to whether the number of executions of the command has reached the number of guaranteed activations by referring to the table 300 of priority commands (STEP 703). The decision as to whether the number of guaranteed activations has been reached is made by comparing the value of the number of processes 303 of the corresponding command in the priority command table 300 with the value of the number of guaranteed activations 302.

If the decision at STEP 703 is Yes (i.e., the number of executions of the command has reached the number of guaranteed activations), the channel processor 1211 enqueues the command into the queue of commands (STEP 702). The processing to be done on reception is terminated. If the decision at STEP 703 is No (i.e., the number of executions of the command has not reached the number of guaranteed activations), the channel processor 1211 performs processing according to the command. For example, if the priority command is an Inquiry command, the channel processor 1211 refers to information about the system configuration held in the shared memory 124, acquires information about the kind and configuration of the storage device 11, and sends the information to the host computer 3. If the command is a ReadCapacity command, the processor refers to the information about the system configuration held in the shared memory 124, acquires information about the capacity of the storage device 11, and sends the information to the host computer 3.

The channel processor 1211 increments the value of the number of processes 303 of the corresponding command in the priority command table 300 by 1 (STEP 705) and terminates the processing.

FIGS. 8A and 8B show diagrams illustrating scheduling of priority commands in the channel adapter 121 associated with the present embodiment. It is now assumed, as an example, that virtual OS#1 in the host computer 3 is issuing I/O commands (non-priority commands) to a certain port of the storage subsystem 1 and that virtual OS#2 is issuing control commands (priority commands) to this certain port. In these figures, numerals are assigned in the orders of receptions to identify received commands. The hatched commands are priority commands such as control commands. To simply the illustration, the unit time is set to 1 second. The number of commands that can be executed within the unit time by the channel processor 1211 is set to 10. The number of guaranteed activations of the priority command is set to 3.

First, as shown in FIG. 8A, where the channel processor 1211 of the channel adapter 121 receives a sequence of commands, a priority command given by command #6 and included in received commands of command #1 to #10 to be executed in the first unit time is executed in preference to other commands. Then, the channel processor 1211 executes priority commands given by command #12 and #18 out of the received commands given by command #11 to #20 to be executed in the next unit time in preference to other commands.

Then, as shown in FIG. 8B, a case is assumed in which priority commands included in commands to be processed within the unit time are received at high frequencies. In this case, the channel processor 1211 executes only priority commands given by command #3 to #5 out of the received commands given by command #1 to #10 to be processed within the first unit time in preference to other commands. That is, the number of priority commands given by command #6, #9, and #10 has reached the number of guaranteed activations and so they are not affected by the scheduling. Similarly, the channel processor 1211 executes the priority commands given by command #15 out of the received commands given by command #11 to #20 to be processed within the next unit time after the priority commands given by previously received command #11 and #12.

Where the channel processor 1211 cannot execute all the commands enqueued in the queue of commands within the unit time, it follows that commands not yet executed are scheduled to be executed in the next unit time.

In the above example, to simplify the explanation, it is assumed that there is one kind of priority commands. If there are plural kinds of priority commands, the channel adapter 121 can similarly execute the priority commands in preference to non-priority commands until each priority command reaches the number of guaranteed activations. In this case, since there is an upper limit for the number of commands capable of being processed within the unit time, there is the danger that the total number of guaranteed activations of plural kinds of priority commands reaches the upper limit. Therefore, a rate of system operation may be set according to the upper limit value. The channel adapter 121 may execute non-priority commands within the range of system operation rates.

As described so far, according to the present embodiment, if the storage subsystem receives priority commands and non-priority commands in a multiplex manner from plural virtual OSes in the host computer 3 or from plural host computers 3 via the same port, the number of executions of priority commands within the unit time is suppressed to below the number of guaranteed activations. Therefore, it is unlikely that response to non-priority commands deteriorates severely. Accordingly, even where I/O commands are treated as non-priority commands, for example, deterioration of the system performance of the storage subsystem 1 can be suppressed to a minimum.

Second Embodiment

A second embodiment is a modification of the first embodiment and provides a storage subsystem which sets the number of guaranteed activations for commands making access to certain storage regions in the hard disk drives 110 and which treats the commands as priority commands.

FIG. 9 is a diagram showing one example of priority command table 900 in a channel adapter associated with the second embodiment of the present invention. The columns of the table 900 that are identical with those of the priority command table 300 already described in the first embodiment are indicated by the same reference numerals as in the table 300.

Referring to FIG. 9, the priority command table 900 of the present embodiment includes columns of command codes 301, LBA specifying flags 901, priority LBA ranges 902, numbers of guaranteed activations 302, and numbers of processes 303. The priority command table 900 of the present embodiment is different from the priority command table 300 of the first embodiment in that the table 900 includes the columns of LBA specifying flags 901 and priority LBA ranges 902. Each LBA specifying flag 901 specifies as to whether or not commands making access to a certain storage region are treated as priority commands. Each priority LBA range 902 is used to specify the certain region in a logical unit. Where the value of the LBA specifying flag 901 is 1 (valid), commands making access to the storage region beginning at the logical block address indicated by the priority LBA range 902 are treated as priority commands only a starting logical block address may be set in the priority LBA range 902. Alternatively, the range may be set by a starting logical block address and an ending logical block address.

Figure 10:
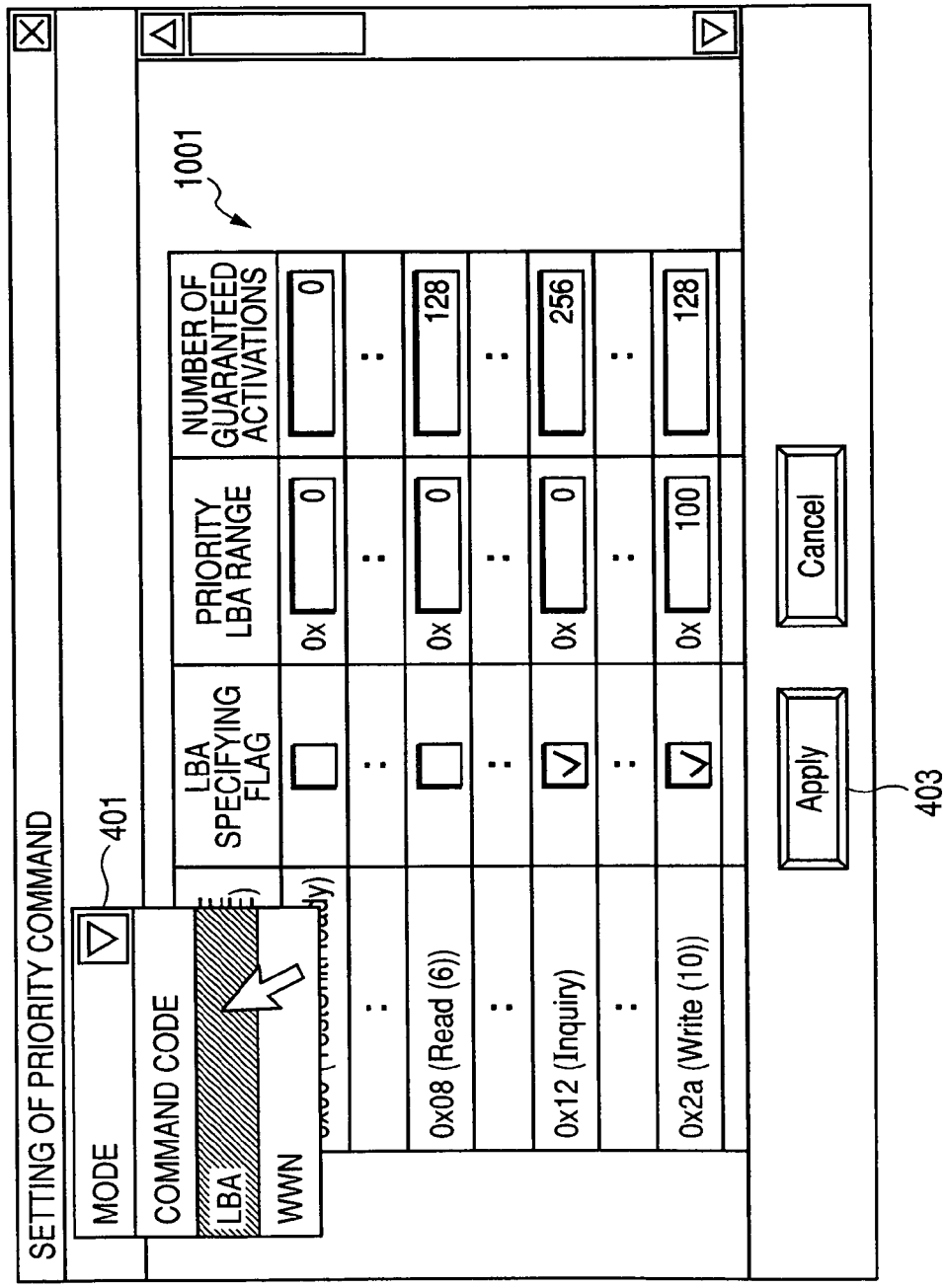
FIG. 10 is a diagram showing one example of priority command-setting window displayed on a user interface on a control apparatus associated with one embodiment of the invention.

FIG. 10 shows one example of priority command-setting window 500 displayed on the user interface on the control apparatus 4 associated with the present embodiment. If the user manipulates the pointing device and specifies an LBA-specifying mode from the mode setting menu 501, a priority command setting table 502 complying with the specified setting mode is presented. If the user wants to specify a command making access to a certain storage region as a priority command, the user checks the check box in the LBA-specifying flag and enters a logical block address in the priority LBA range. In the present embodiment, Inquiry command and Write(10) command are specified. The item of the check box of the LBA specifying flag indicating Read(6) command is not checked off but the number of guaranteed activations is specified. Therefore, the Read(6) command is treated as a priority command.

When inputting of the priority command ends, the user selects the Apply button 503. In response to this, the control apparatus 4 sends a priority command-setting request to the channel adapter 121 to set the channel adapter 121 to the contents of the input. When the priority command-setting request is received via the LAN controller 1213, the channel adapter 121 updates the priority command table 300 in the local memory 1222 based on the priority command-setting request under control of the channel processor 1211.

Figure 11:
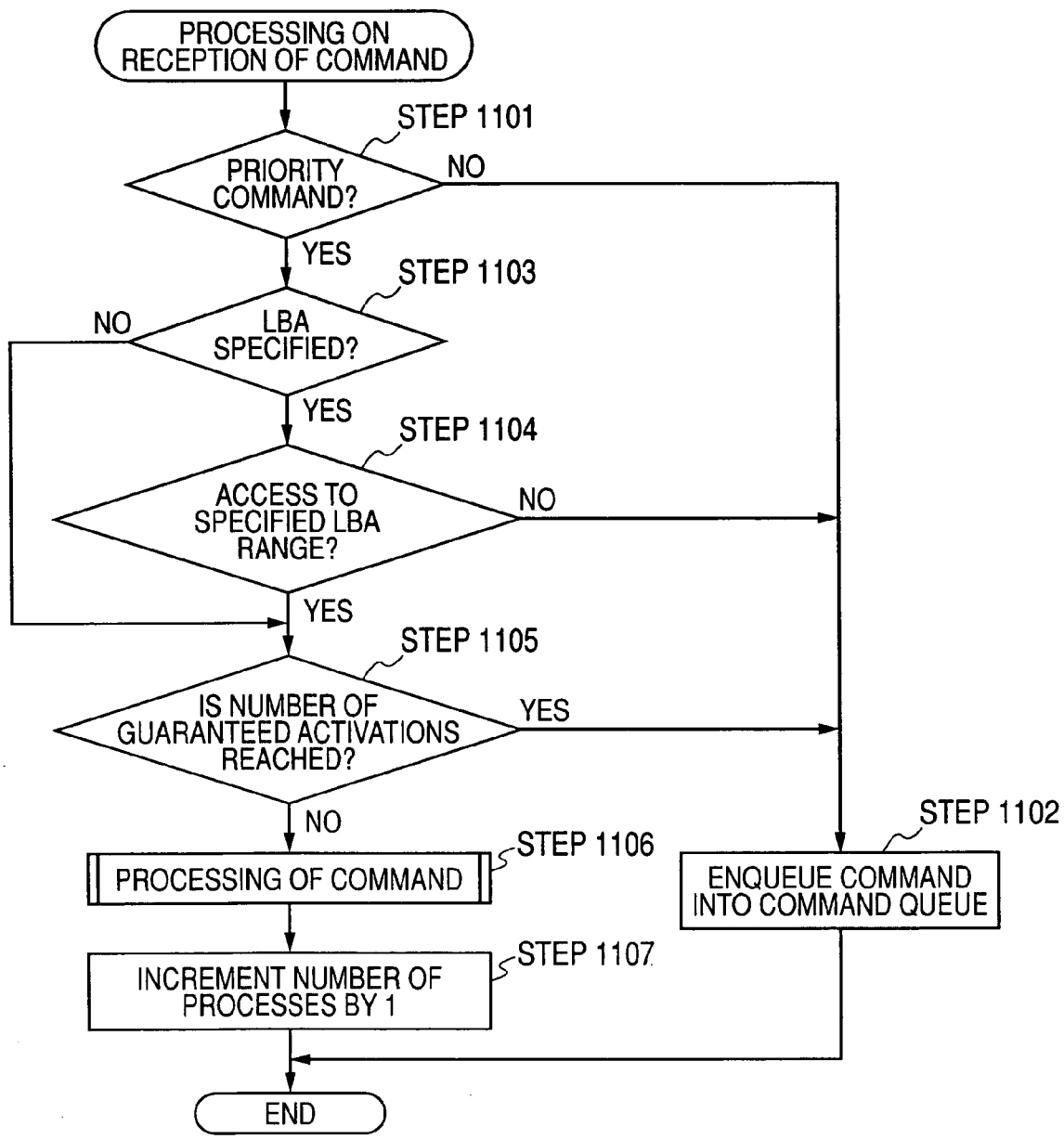
FIG. 11 is a flowchart illustrating processing performed on reception of commands by a channel processor associated with one embodiment of the invention.

FIG. 11 is a flowchart illustrating processing performed on reception of commands by the channel processor 1211 associated with one embodiment of the present invention. The flowchart of FIG. 11 is different from the flowchart illustrated in FIG. 7 in that STEPs 1103 and 1104 are added.

That is, as shown in FIG. 11, the channel processor 1211 makes a decision as to whether or not the received command is a priority command by referring to the priority command table 300 (STEP 1100). As described previously, the decision as to whether or not it is a priority command depends on whether the value of the number of guaranteed activations 302 of the corresponding command in the priority command table 300 is nonzero. That is, if the value of the number of guaranteed activations 302 is a nonzero value, the command is judged to be a priority command.

If the decision at STEP 1101 is No, i.e., the received command is not a priority command, the channel processor 1211 enqueues the command (i.e., a non-priority command) in the queue of commands (STEP 1102). Then, the processing is terminated. On the other hand, if the decision at STEP 1101 is negative (No), i.e., the received command is a priority command, the channel processor 1211 refers to the priority command table 300 and makes a decision as to whether or not the value of the LBA specifying flag 902 is "1" (STEP 1103).

If the decision at STEP 1103 is No (i.e., the value of the LBA specifying flag 902 is not "1"), the channel processor 1211 then makes a decision as to whether the number of executions of the command has reached the number of guaranteed activations (STEP 1105). On the other hand, if the decision at STEP 1103 is Yes (i.e., the value at the LBA specifying flag 902 is "1"), the channel processor 1211 makes a decision as to whether the command is an access to the specified LBA range (STEP 1104). If the decision at STEP 1104 is affirmative (Yes) (i.e., the command is an access to the specified LBA range), the channel processor 1211 then makes a decision as to whether the number of the executions of the command has reached the number of guaranteed activations (STEP 1105). Subsequent processing is similar to the processing starting with STEP 703 of FIG. 7 and so its description is omitted.

On the other hand, if the decision at STEP 1104 is negative (No), i.e., the command is not an access to the specified LBA range, the channel processor 1211 enqueues the command into the queue of commands (STEP 1102) and terminates the processing.

As described so far, according to the present embodiment, commands included in device recognition commands and making I/O accesses to a certain storage region in the hard disk drives 110 can be treated as priority commands. Consequently, the system can be run more efficiently.

Third Embodiment

A third embodiment is a modification of the first embodiment and provides a storage subsystem 1 for making a decision as to whether commands issued by each individual host computer 3 should be treated as priority commands.

Figures 12, 13:
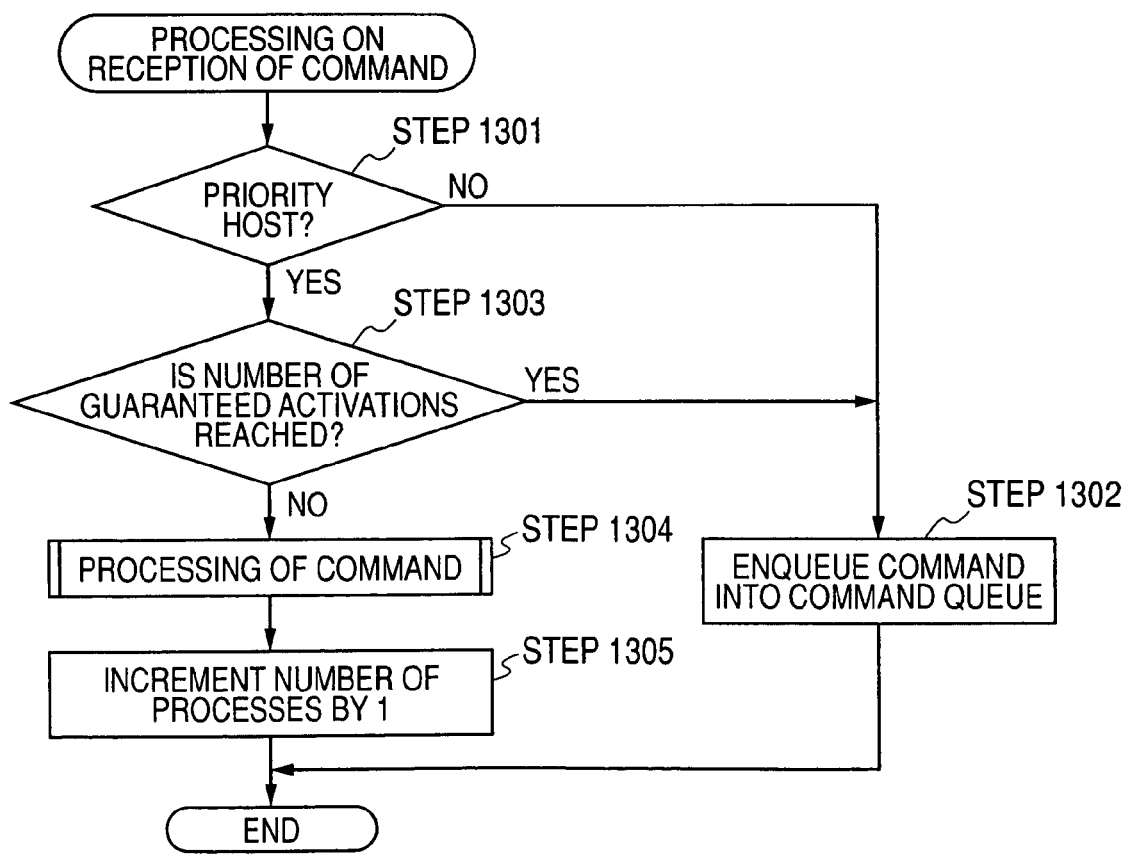
FIG. 12 is a table of priority commands used in a channel adapter associated with one embodiment of the invention.
FIG. 13 is a flowchart illustrating processing performed on reception of commands by a channel processor associated with one embodiment of the invention.

FIG. 12 is a diagram illustrating one example of a priority command table 1200 in a channel adapter associated with the third embodiment of the present invention.

Referring to FIG. 12, the priority command table 1200 of the present embodiment includes columns of host WWNs 1201, numbers of guaranteed activations 302, and numbers of processes 303. The priority command table 1200 of the present embodiment is different from the priority command table 300 of the first embodiment in that the column of host WWNs 1201 is included instead of command codes 301. The host WWNs 1201 indicate intrinsic network identification information assigned to the port of the host computer 3. Typically, the information is a World Wide Name (WWN). The channel adapter 121 of the storage subsystem 1 can recognize from which of the host computers 3 was the command sent by referring to the WWN included in the communication packet, based on the sent command.

FIG. 13 is a flowchart illustrating processing performed on reception of commands by the channel processor 1211 associated with the third embodiment of the invention. FIG. 13 particularly illustrates the processing illustrated in STEP 604 of FIG. 6.

As shown in FIG. 13, the channel processor 1211 refers to the priority command table 1200 and makes a decision as to whether the received command was sent from the host computer 3 to be prioritized (STEP 1300). The decision as to whether the host computer is a prioritized host computer depends on whether the value of the number of guaranteed activations 302 of the corresponding command in the priority command table 1200 is nonzero.

If the decision at STEP 1301 is negative (No), i.e., the received command was not sent from a prioritized host computer, the channel processor 1211 enqueues the command (i.e., non-priority command) into the queue of commands (STEP 1302), and then terminates the processing. On the other hand, if the decision at STEP 1301 is negative (No), i.e., the received command was derived from a prioritized host computer, the channel processor 1211 refers to the priority command table 300 and makes a decision as to whether the number of executions of the command has reached the number of guaranteed activations (STEP 1303). Subsequent processing is similar to the processing starting at STEP 704 of FIG. 7 and so its description is omitted.

As described so far, according to the present embodiment, all commands issued from the host computer 3 identified by the WWN can be treated as priority commands or as non-priority commands; it is not the case where each individual command is determined as a priority command or as a non-priority command. Hence, the system can be run more flexibly.

Fourth Embodiment

A fourth embodiment provides a storage subsystem 1 in which priority commands can be set for each host device (host computer 3 or virtual machine).

FIG. 14 is a diagram illustrating one example of a priority command table 1400 in a channel adapter associated with the fourth embodiment of the present invention.

Referring to FIG. 14, the priority command table 1400 of the present embodiment includes columns of host WWNs 1201, command codes 301, LBA specifying flags 901, priority LBA ranges 902, the numbers of guaranteed activations 302, and the numbers of processes 303. It can be regarded that in the priority command table 1400 of the present embodiment, the priority command table 900 illustrated in the second embodiment is prepared for each host computer 3 identified with a WWN.

Figure 15:
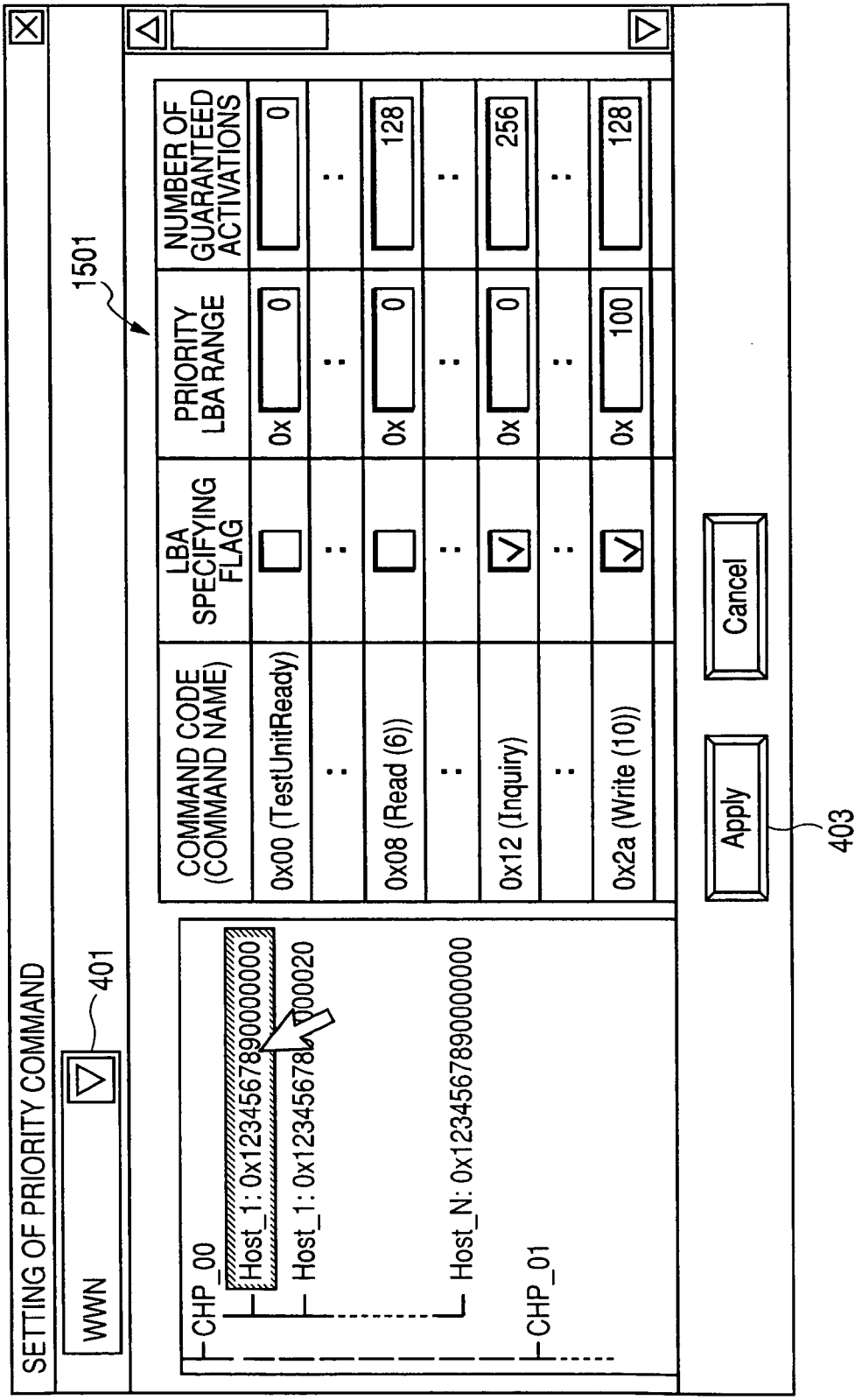
FIG. 15 is a diagram illustrating processing performed on reception of commands by a channel processor associated with one embodiment of the invention.

FIG. 15 shows one example of a priority command-setting window 500 displayed on the user interface on a control apparatus 4 associated with the present embodiment. If the user manipulates the pointing device and specifies a WWN-specifying mode from a mode setting menu 501, a priority command-setting table 502 complying with the specified setting mode is presented. The priority command-setting window 500 of the present embodiment includes a host WWN setting region 1501, which causes a host WWN set for each individual channel processor 1211 to be displayed in a tree form. When the user specifies the host WWN of the channel processor 1211 to be set within the host WWN-setting region 1501 with a pointing device, the priority command-setting table 502 of the corresponding host WWN is displayed.

When inputting of a priority command ends, the user selects the Apply button 503. In response to this, the control apparatus 4 sends a priority command-setting request to the channel adapter 121 such that the adapter 121 is set to the entered contents. On receiving the priority command-setting request via the LAN controller 1213, the channel adapter 121 updates the priority command table 300 in the local memory 1222 based on the priority command-setting request under control of the channel processor 1211.

The channel processor 1211 of the present embodiment performs processing consisting of making a decision as to whether a command sent from each host computer 3 identified with a WWN is a priority command and performing a corresponding operation. That is, if a command is received from the host computer 3, the channel processor 1211 performs the processing illustrated in FIG. 11 according to the attributes of the commands set for each individual host computer 3.

As described so far, according to the present embodiment, priority commands can be set for each individual host computer 3 identified with a WWN. The system can be run more flexibly and efficiently.

The present invention can be widely applied to storage subsystems connected with host computers.

What is claimed is:

1. A storage subsystem comprising:
a plurality of hard disk drives; and
a controller configured to execute a plurality of commands received from a host computer coupled to the controller for the plurality of hard disk drives and to determine whether each received command is a priority command based on priority command information that defines attributes of command, and wherein, for each received command, upon determining that the received command is not a priority command, the controller adds the received command to a non-priority command queue, wherein, for each received command, upon determining that the received command is a priority command, unless a quantity of priority commands to be executed during a predetermined time period is greater than a predetermined value, the controller executes the received command in preference to each received command to be executed during the predetermined time period in the non-priority command queue, and wherein the controller successively executes each received command to be executed during the predetermined time period that is determined to be a priority command in preference to each received command to be executed during the predetermined time period in the non-priority command queue within said predetermined time period until said predetermined value of priority commands have been executed.

2. A storage subsystem as set forth in claim 1, wherein each priority command is one of an inquiry command and a read capacity command, and each non-priority command is an I/O command.

3. A storage subsystem as set forth in claim 1, wherein the priority command information includes a logical block address indicating a specified storage region in said hard disk drives.

4. A storage subsystem as set forth in claim 3, wherein, if a received command is a command that designates the specified storage region, the controller determines said received command to be a priority command.

5. A storage subsystem as set forth in claim 1, wherein said host computer includes a plurality of virtual machines, and wherein the virtual machines send said plurality of commands to said controller.

6. A storage subsystem as set forth in claim 1, wherein the controller creates the priority command information based on a priority command-setting request sent from a management apparatus.

7. A method of executing commands for a plurality of hard disk drives from a host computer by a controller coupled to the host computer, said method comprising:

receiving a plurality of commands from said host computer via a port;

determining whether each received command is a priority command based on priority command information that defines attributes of commands;

adding each received command that is determined to not be a priority command to a non-priority command queue; and for each received command that is determined to be a priority command, unless a quantity of priority commands to be executed during a predetermined time period is greater than a predetermined value, executing the received command in preference to each received command to be executed during the predetermined time period in the non-priority command queue, and wherein the received commands to be executed during the predetermined time period that are determined to be priority commands are successively executed in preference to each received command to be executed during the predetermined time period in the non-priority command queue within said predetermined time period until said predetermined value of priority commands have been executed.

8. A method of executing commands as set forth in claim 7, wherein each priority command is one of an inquiry command and a read capacity command, and each non-priority command is an I/O command.

9. A method of executing commands as set forth in claim 7, wherein the priority command information includes a logical block address indicating a specified storage region in said hard disk drives.

10. A method of executing commands as set forth in claim 9, wherein, if a received command is a command that designates the specified storage region, said controller determines said received command to be a priority command.

11. A method of executing commands as set forth in claim 7, further comprising creating the priority command information based on a priority command-setting request sent from a management apparatus.

12. A method of executing commands as set forth in claim 7, wherein said controller receives the plurality of commands from a plurality of virtual machines included in the host computer via said port.

* * * * *